United States Patent [19]

Geissler

[11] 4,371,811
[45] Feb. 1, 1983

[54] ELECTRONIC FLASH GUN STRUCTURE

[75] Inventor: Udo M. Geissler, Munich, Fed. Rep. of Germany

[73] Assignee: Patent-Treuhand-Gesellschaft fuer elektrische Glühlampen mbH, Munich, Fed. Rep. of Germany

[21] Appl. No.: 230,904

[22] Filed: Feb. 2, 1981

[30] Foreign Application Priority Data

Feb. 11, 1980 [DE] Fed. Rep. of Germany ... 8003592[U]

[51] Int. Cl.³ .......................................... H05B 41/32
[52] U.S. Cl. .................... 315/241 P; 362/9; 362/18
[58] Field of Search ............... 315/241 P, 151; 362/9, 362/16, 18; 354/145

[56] References Cited

U.S. PATENT DOCUMENTS 4,190,880  2/1980  Esaki .................................... 362/18
4,238,150 12/1980  Quinn ................................. 354/145
4,298,909 11/1981  Krieg ................................... 362/18

Primary Examiner—Eugene R. La Roche
Attorney, Agent, or Firm—Frishauf, Holtz, Goodman & Woodward

[57] ABSTRACT

To permit easy handling and pivoting of the flash head of a flash gun using an elongated flash tube, in which the reflector units are rotatable relative to each other, a tubular structure (2) is provided retaining electronic and energy supply components for the flash gun, terminating in a cylindrical flange platform (3); the flash tube (8)-reflector (7) combination is located in a cylindrical housing (4) which has a cylinder axis (6) at right angles to the axis (5) of the tube, the housing (4) terminating in a flange-like extension having a cylindrical end portion (11) which fits on the platform (3) of the tube, and is rotatable with respect thereto.

2 Claims, 3 Drawing Figures

ELECTRONIC FLASH GUN STRUCTURE

Cross reference to related application, assigned to the assignee of the present invention: U.S. Ser. No. 48,039, filed June 13, 1979, KREIG, now U.S. Pat. No. 4,298,909.

The present invention relates to an electronic flash gun structure, and more particularly to an electronic flash gun which contains operating and power elements and an elongated flash tube within a reflector structure in which the reflector is arranged for selective direct, indirect, or mixed direct-indirect illumination.

BACKGROUND

Various types of electronic flash units or flash guns are known utilizing an elongated flash tube which is associated with a reflector of generally parabolic shape. A flash gun in which the reflector can be pivoted about the axis of the elongated tube permits direct, indirect, or, if the reflector is sectioned, mixed direct-indirect illumination. Structures in which the reflector is fixed in a housing, and the entire housing is pivotable with respect to a holder adapted for attachment to a camera, for example a flash shoe, are well known; in other structures, however, the housing is stationary, and the reflector is pivotable within the housing. It has been proposed to position the elongated light source and a section reflector in a cylindrical housing which is closed off at the front by a light transmissive disk, for example a plastic disk. The cylindrical housing is joined to a housing of essentially similar longitudinal extent which retains the operating circuitry, batteries, or other electrical devices to supply energy to the flash tube and to meter the amount of light emitted therefrom. The housing portion itself carries the attachment shoe. The known flash gun can be used for selectively different illumination of an object by suitable direction of the reflector so that the subject to be illuminated is either directly illuminated, or indirect illumination is directed to a ceiling or other reflective screen; sectional reflectors permit, selectively, mixed direct and indirect illumination. In use, the apparatus is coupled to the camera by engaging the flash shoe on the housing of the flash gun with the matching camera shoe. The illumination of the subject to be photographed thus is approximately the same as the viewing direction from the camera, since the electronic flash gun and its light source—reflector combination is attached to the camera. For many photographs, this is a suitable illumination; frequently, however, it is desired to have the light emanate from a location other than the position of the camera, or to use a further flash gun which is termed a "slave" unit either for fill-in or highlight or general illumination.

THE INVENTION

It is an object to provide a flash gun which can be used together with a camera, either as the sole flash gun or as a "slave" unit, which has the advantages of providing selectively direct or indirect illumination without tipping of the housing, and which is compact and easy to handle.

Briefly, the elongated flash tube, together with a parabolic reflector which is sectionalized into a plurality of axially staggered sections, is located in a cylindrical housing. The cylindrical housing has an attachment flange formed thereon or secured thereto which defines a circular attachment plane extending at right angles to the axis of the flash tube. The reflector is rotatable within the reflector housing. The electronic and energy supply components for the flash gun are secured within a tubular handle which has a head portion formed with an attachment flange and defining an attachment surface which is approximately the same size as the attachment plane of the cylindrical reflector—flash tube unit, and fitting thereon. The flash tube—reflector unit is rotatable with respect to the tubular handle, for example about an angle of 180°. The electrical connection between the flash tube and the remaining portions of the electrical circuitry and energy supply components can be by a flexible lead of sufficient length to accommodate the relative rotation of the reflector—tube housing and of the tubular handle. The axis of the tubular handle preferably is also the axis of rotation which, for example, can be constructed as a spring-loaded nut, rivet, or the like. In a preferred form, the reflector-flash tube housing combination is symmetrically positioned with respect to the axis of the tubular handle. The handle portion and the flash tube—reflector housing portions can be of molded plastic material, with the control of the reflector angle adjustment being formed as a ring at one end of the cylindrical housing of the reflector—flash tube combination, the other end, for example, containing an adjustment ring to place one or more filters or the like in front of the flash tube and/or reflector.

DRAWINGS

Figure 1:
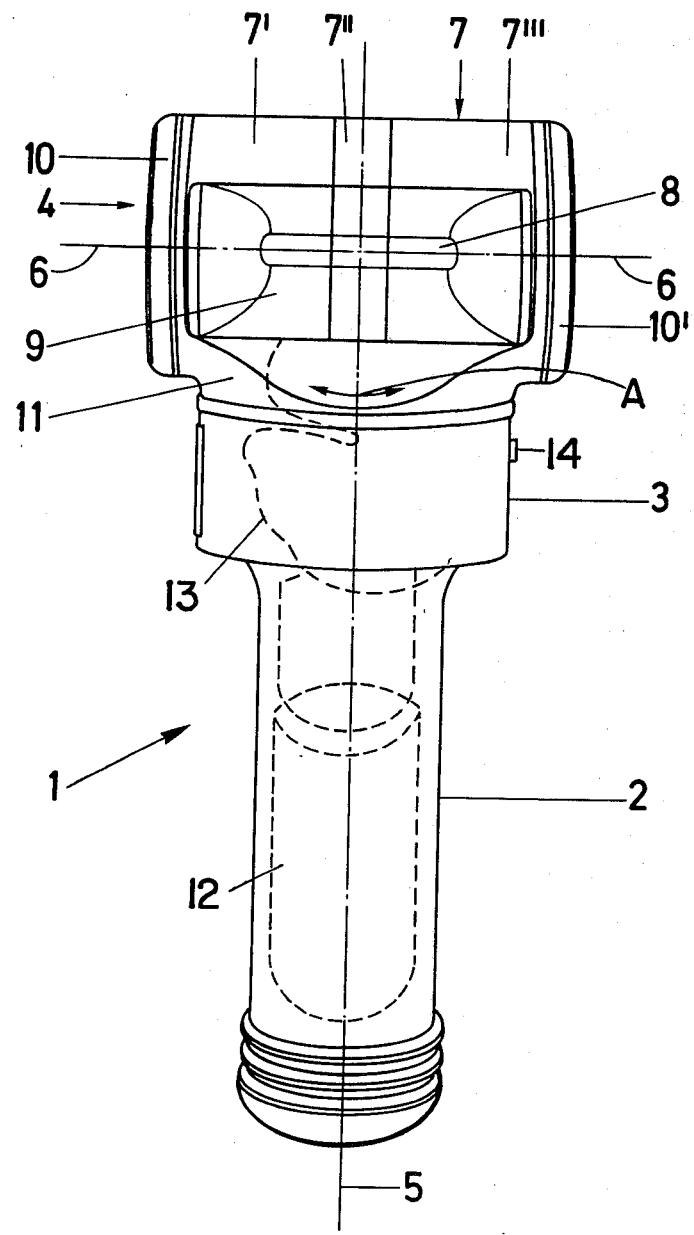
FIG. 1 is a front view of the flash gun.
Figure 2:
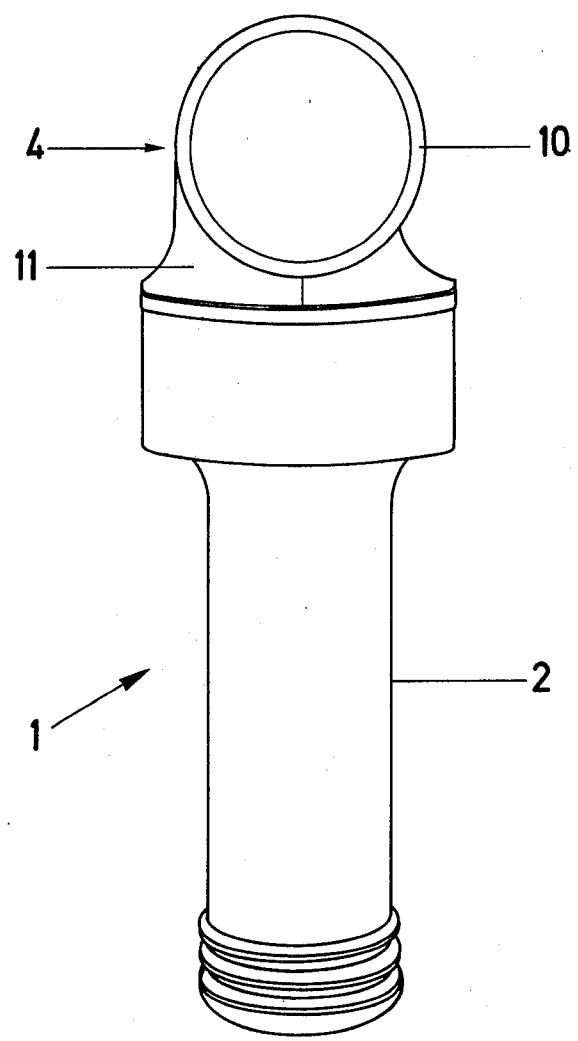
FIG. 2 is a side view from the left side, with respect to FIG. 1.
Figure 3:
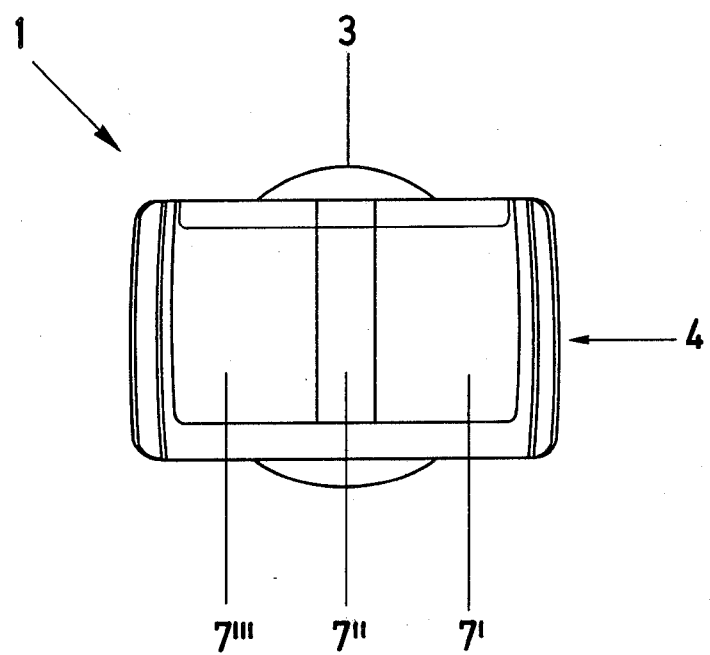
FIG. 3 is a top view.

The flash gun 1 has a reflector 7 which is divided into three sections 7', 7'', 7'''. The flash tube 8 extends transversely, approximately in the focal point of the reflector. The reflector and flash tube may be in accordance with any suitable construction, the particular reflector shape as disclosed in the copending application Ser. No. 048,039, filed June 13, 1979, KRIEG, now U.S. Pat. No. 4,298,909, being preferred. The reflector sections 7', 7''' preferably can be pivoted together upwardly, with respect to FIG. 1, whereas the section 7'' can remain in the position shown in FIG. 1, that is, providing direct illumination if the flash gun is held in the position shown in this figure. A light transmissive outwardly bowed lens closes off the reflector; the lens may be formed with light directing deformations, for example prisms, striations, grooves, or the like. A filter or diffusion disk, not shown, can be located immediately behind the light transmissive lens or window. The filter is coupled to a rotatable ring 10 (FIG. 2) to move its filter or diffusion portion in front of the reflector opening. A ring 10', at the right side of the reflector housing, is coupled internally to the reflector sections 7', 7''' to provide for relative rotation of the reflector portions 7', 7''' with respect to the reflector portion or section 7''. The axis of rotation preferably is the same as the central axis 6 of the light tube 8 which also essentially is the focal line of the reflector. The rings 10, 10', the window or lens 9 surrounding the elongated flash tube 8 and the reflector 7 are all positioned on a cylindrical light source housing 4 which has as its central axis the axis 6. The light source housing 4 is joined to a tubular structure 2 which retains the various operating and energy supply components to operate the flash gun. This tubular element 2 defines an apparatus chamber within the energy supply and control components only schematically indicated at 12 in FIG. 1 are positioned. Current supply leads 13 extend from the components 12 to the flash tube 8. The flash gun can be triggered, for example, by connection to a contact shoe on a camera, not shown in the figures, and well known as such; or, for example, by connection to an external cable on a cable terminal 14, if the gun is to be used as a "slave" unit coupled to another flash gun, to be triggered together therewith.

The tubular apparatus chamber structure 2 has a head portion 3 which extends in form of a flange and defines a platform on which the cylinder housing 4 is positioned. The cylinder housing 4 is likewise formed with a flange-like extension defining a support plane which matches the support platform. The cylinder housing 4 is positioned at right angles to the tube axis 5 of the tubular chamber structure 2, and symmetrical with its central axis 6 with respect to the tubular chamber axis 5. The diameter of the cylinder housing 4 is less than the diameter of the tubular head portion 3—see FIG. 2. The tube axis 5 and the central axis 6 about which the reflector sections 7', 7'', 7''' are rotatable have a common intersection. The cylinder housing 4 is rotatable about the tubular chamber structure 2 on a central rotary joint in the head portion 3 which, for example, may be a bolt, rivet, pin or the like, preferably spring-loaded to maintain the relatively rotated parts in tight contacting engagement and prevent contamination by dirt or the like. The direction of rotation is indicated by the double arrow A (FIG. 1) and may be limited, for example, to 90° or 120° in either direction from the position shown in FIG. 1, for example by a stop pin (not shown).

Let it be assumed that the flash gun is secured to a camera by a standard attachment shoe (not shown) and located, for example, at the flat bottom surface of the tubular element 2, side-indirect illumination can be obtained by rotating the housing 4 with respect to the camera to direct the light towards a reflective surface, for example a reflective screen; additionally, the light can be directed upwardly by rotating the adjustment ring 10' to permit pivoting of the reflector sections 7', 7''' upwardly from the position shown in FIG. 1. Thus, the direction of light from the flash gun with respect to the scene to be illuminated can be separately controlled.

The cylindrical housing 4 merges smoothly in the cylindrical ring flange portion 11 towards the head portion 3 of the tubular structure 2. Thus, a compact unit is obtained which can be easily gripped or mounted on a camera, or separately, while permitting adjustment of the direction of light therefrom in an azimuth and in tilting direction by adjustment of the ring 10', and hence tilting of the reflector sections 7', 7''', as well as providing for slewing of the entire reflector about the central axis 5 of the tubular structure 2.

I claim:

1. Electronic flash gun structure having an essentially linear flash tube (8);
    a reflector (7) having sectional portions (7',7'', 7''') of which at least some are rotatable about an axis coincident with the central axis (6) of the flash tube;
    a cylindrical housing (4) surrounding and retaining in position said flash tube (8) and said reflector (7), and formed with a transparent window portion (9) for transmission of light flashes from the tube;
    and a support and apparatus chamber structure supporting said cylindrical housing and retaining electrical apparatus components for operation of the flash tube (8),
    wherein said support and apparatus chamber structure comprises
    a tube (2) closed at one end and defining a tube axis (5);
    a flange-like cylindrical head portion (3) formed at the other end defining a support platform, and extending transversely to the axis (5) of the tube;
    and said cylindrical housing (4) comprises
    an attachment flange (11) defining an attachment plane positioned parallel to said central axis (6) and perpendicular to said tube axis (5), integral with said housing (4) and of cylindrical shape which matches and fits on the cylindrical head portion (3) of said tube (2);
    said flange-like head portion (3) and the attachment flange (11) being rotably joined to place the support platform and the attachment plane in parallel position and relatively rotatable about said axis (5) of the tube;
    and wherein the central axis (6) of the flash tube, about which some of the sectional reflector portions are rotatable, and the tube axis (5) of the tube (2) have a common intersection to position the cylindrical housing (4) symmetrical with respect to the tube axis (5) of the tube.

2. Structure according to claim 1 wherein the diameter of the cylindrical housing (4) is less than the diameter of the flange-like head portion (3) of the tube (2).

* * * * *